United States Patent [19]

Ohashi

[11] Patent Number: 5,004,318
[45] Date of Patent: Apr. 2, 1991

[54] SMALL OPTICAL FIBER SWITCH

[75] Inventor: Shigeo Ohashi, Tokyo, Japan

[73] Assignee: Nihon Kaiheiki Kogyo Kabushiki Kaisha, Tokyo, Japan

[21] Appl. No.: 472,104

[22] Filed: Jan. 30, 1990

[30] Foreign Application Priority Data

Sep. 6, 1989 [JP] Japan .................................. 1-104710

[51] Int. Cl.⁵ .............................. G02B 6/26; G02B 6/34
[52] U.S. Cl. .............................. 350/96.20; 350/96.21; 350/96.19
[58] Field of Search ................ 350/96.10, 96.13, 96.14, 350/96.15, 96.16, 96.19, 96.20, 96.21, 96.22, 96.29, 96.34

[56] References Cited

U.S. PATENT DOCUMENTS

| 3,941,927 | 3/1976 | Russell | 350/96.10 |
| 4,170,731 | 10/1979 | Howell et al. | 350/96.21 X |
| 4,204,742 | 5/1980 | Johnson et al. | 350/96.29 |
| 4,437,728 | 3/1984 | Ohashi | 350/96.20 |
| 4,674,831 | 6/1987 | Bagby | 350/96.20 |
| 4,896,937 | 1/1990 | Kraetsch et al. | 350/96.20 |
| 4,898,445 | 2/1990 | Newell et al. | 350/9620 |
| 4,911,520 | 3/1990 | Lee | 350/96.20 |
| 4,938,559 | 7/1990 | Bruch et al. | 350/96.20 |
| 4,948,223 | 8/1990 | Anderson et al. | 350/96.20 |

FOREIGN PATENT DOCUMENTS

| 57-139704 | 8/1982 | Japan | 350/96.18 X |
| 62-124519 | 6/1987 | Japan | 350/96.13 X |

Primary Examiner—Brian Healy
Attorney, Agent, or Firm—Birch, Stewart, Kolasch & Birch

[57] ABSTRACT

A small switch comprises a casing, a plurality of optical fibers attached to the casing, a vertically movable member disposed, facing the ends of the optical fibers. The movable member has a resilient member provided at one end, and a member, which is deformed to be contracted by supplying an electric power, provided at the other end. The member, which is deformed to be contracted, that is, for causing the movable member to move vertically may comprise a shape memory alloy or a bimetal. The movable member may comprise an interceping plate has an aperture for transmitting therethrough, or a prism for deflecting a light beam.

9 Claims, 2 Drawing Sheets

PRIOR ART

SMALL OPTICAL FIBER SWITCH

BACKGROUND OF THE INVENTION

This invention relates in general to an optical switch, more particularly a small or miniaturized optical switch in which a light beam is transmitted and intercepted by moving an intercepting plate or a prism by means of a shape memory alloy and the like.

In a conventional optical switch, as shown in FIG. 9, a plunger 52 is moved to the left side and to the right side by means of an electromagnet comprising an iron core 53 and a coil 54 so that a diverter or deflector 56 is swung to cause an optical fiber 55 to move and thereby diverting a light beam.

In the conventional optical switch, however, the use of an electromagnet results in a large volume of the switch and thus there are obstacles to miniaturizing the optical switch. Thus, there have been needs for developing a miniaturized switch in order to meet the miniaturization of instruments.

Moreover, in the conventional optical switch, due to the fact that the optical fiber is moved verticaly, i.e. upwardly and downwardly, failures or damages of the switch would shorten its lifetime.

Moreover, in the conventional switch, it is very difficult to align the left and right elements of the optical switch with each other, and thus the switch is significantly expensive.

SUMMARY OF THE INVENTION

The present invention is made to overcome the above-mentioned disadvantages of the prior art, and the object of the present invention is to provide a novel miniaturized optical swtich which is small in size, has no loss of light beam due to failures or damages, and has a stable performance.

It is a further object of the present invention to provide a novel miniaturized optical switch which can switch over a light beam without moving an optical fiber, can make small a distance between optical fibers, and allow an insertion loss to be less than 0.5 dB.

To accomplish the above-mentioned objects, the miniaturized optical switch according to the present invention is constructed so that a plurality of optical fibers are attached to a casing, a movable member is located to move upwardly and downwardly between the opposed ends of the optical fibers, or facing the ends of the optical switch, the movable member having a resilient member provided at one end and a member, which is deformed to be contracted by supplying a power, provided at the other end.

With the above-mentioned construction of the miniaturized optical switch, when supplied with power, the member provided at the other end of the vertically movable member is deformed to be contracted, and thereby transmitting or intercepting a light beam between the opposed or juxaposed optical fibers by moving the movable member.

DESCRIPTION OF THE DRAWING

These and other objects of the invention will be seen by reference to the description, taken in connection with the accompanying drawing, in which.

DESCRIPTION OF THE PREFERRED EMBODIMENTS

Figure 1:
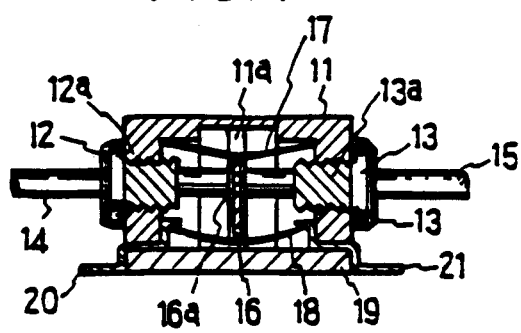
FIG. 1 is a front view showing a first embodiment according to the invention.
Figure 2:
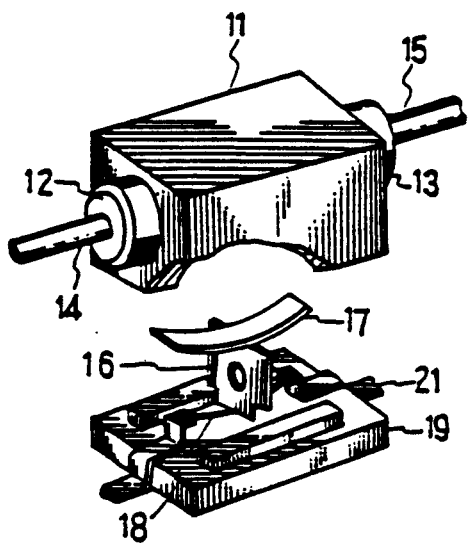
FIG. 2 is an exploded perspective view showing the first embodiment according to the invention.
Figure 3:
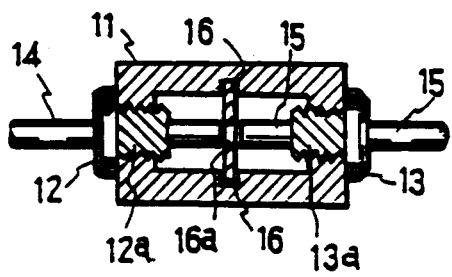
FIG. 3 is a top plan view showing the first embodiment according to the invention.

FIG. 1 is a front view showing a first embodiment according to the invention, FIG. 2 is an exploded perspective view showing the first embodiment according to the invention, and FIG. 3 is a top plan view showing the first embodiment according to the invention.

Referring to the FIGS. 1 to 3, showing a first embodiment according to the invention, a box-shaped casing 11 is formed at its opposite ends with threads, and fixtures 12 and 13 have corresponding thread portions 12a and 13a which are provided with a plurality of grooves and through-holes. Optical fibers 14 and 15 are clamped and attached to the casing 11 by inserting these optical fibers 14 and 15 into the through-holes of the fixtures 12 and 13 and then screwing the fixtures 12 and 13 into the opposite thread portions of the casing 11.

Within the casing 11, an intercepting plate 16 with an aperture 16a is disposed between the opposed optical fibers 14 and 15 so that the intercepting plate 16 is movable vertically along the grooves 11a provided on the inner surfaces of the casing 11. The intercepting plate 16 has a leaf spring 17 at its upper end, and a shape memory alloy 18, which is contractible when supplied with an electric power, at its lower end. The opposite ends of the shape memory alloy 18 are connected to terminals 20 and 21 provided on a base 19.

When power is supplied to the terminals 20 and 21, the shape memory alloy 18 is contracted to bias the intercepting plate 16 upwardly and thereby interceping a light beam between the optical fibers 14 and 15. Conversely, the optical switch may be constructed so that a light beam is intercepted before supplying power, and the intercepting plate 16 is biased upwardly to transmit a light beam through the aperture 16a between the optical fibers 14 and 15.

Figure 4:
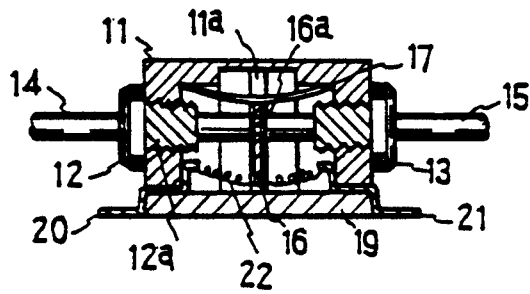
FIG. 4 is a cross-sectional view showing a variant of the first embodiment.

FIG. 4 is a cross-sectional view showing a variant of the first embodiment.

In FIG. 4, the variant is constructed so that a shape memory alloy 22 connected to terminals 20 and 21 is made to be in the coiled form in order to increase its quantity of contraction.

Figure 5:
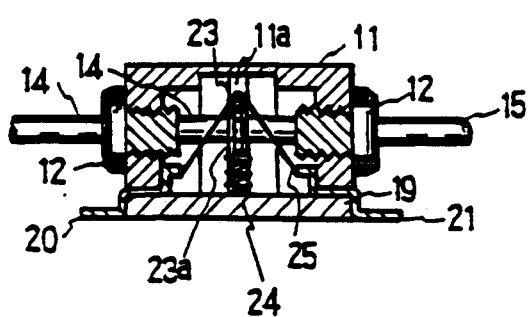
FIG. 5 is a cross-sectional front view showing a second embodiment accordign to the invention.

FIG. 5 is a cross-sectional front view showing a second embodiment according to the invention.

Referring to FIG. 5, in the second embodiment, an intercepting plate 23 has an aperture 23a provided substantially at its middle portion. The intercepting plate has a coiled spring 24 disposed at its lower end, and a shape memory alloy 25 disposed at its upper end. The intercepting plate 23 is formed with projections and grooves to position the shape memory alloy 25.

The intercepting plate 23 is not limited to the aperture 23a, and may have a cut-out instead. The configuration of the intercepting plate may varied to other than that shown in the FIG. 5.

Figure 6:
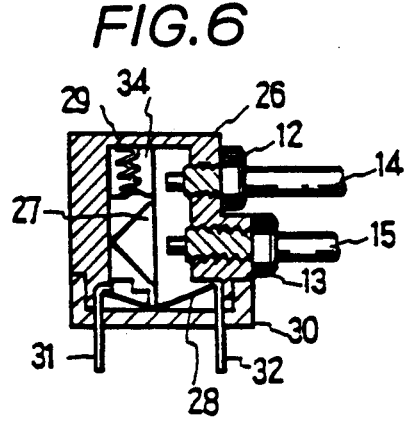
FIG. 6 is a cross-sectional front view showing a third embodiment utilizing a prism according to the invention.
Figure 7:
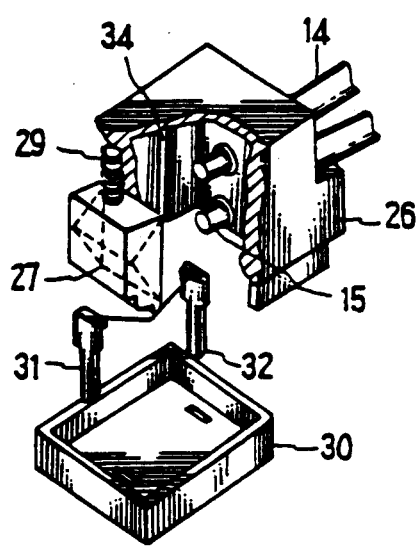
FIG. 7 is an exploded perspective view showing the third embodiment according to the invention.

FIG. 6 is a cross-sectional front view shown a third embodiment utilizing a prism according to the invention, and FIG. 7 is an exploded perspective view showing the third embodiment according to the invention.

Referring to FIGS. 6 and 7, in the third embodiment, instead of the intercepting plate, a prism 27 is provided. Two optical fibers 14 and 15 are disposed on one side of a casing 26, and a shape memory alloy 28 is energized to transmit or intercept a light beam.

Figure 8:
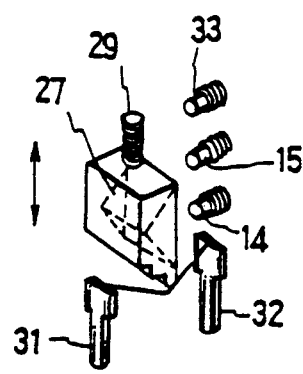
FIG. 8 is a perspective view showing a main portion of a fourth embodiment utilizing a prism according to the invention.
Figure 9:
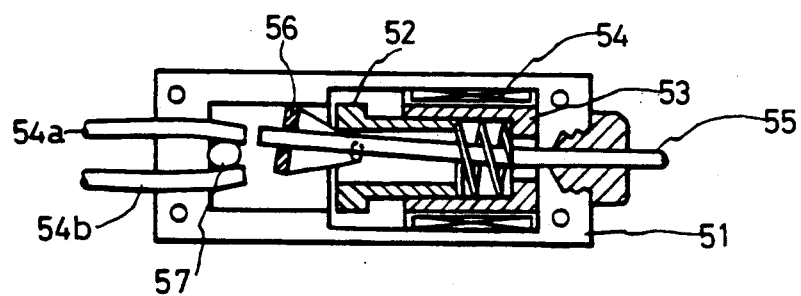
FIG. 9 is a cross-sectional view showing a prior art.

FIG. 8 is a perspective view showing a main portion of a fourth embodiment utilizing a prism according to the invention.

In FIG. 8, three optical fibers 14, 15 and 33 are attached to the casing in vertical alignment. A light beam is switched over among these optical fibers by the prism 27.

As an alternative, bimetal, not shown, may be utilized. The bimetal is attached at its end to the casing to be in a cantilever fashion, and that end of the bimetal projects outwardly to form a terminal. When the terminal is supplied with a power, the movable member is caused to move. Moreover, the bimetal may be provided at its periphery with a resistor, which is supplied with a power.

In the above-mentioned embodiments, the optical fiber may be provided at its end with a lens so that a light beam can converged in order to decrease loss of light.

The present invention is not limited to these embodiments and may have various modifications and alternations.

According to the above-mentioned constructions and features of the invention, the following effects (1) to (8) can be obtained:

(1) Since according to the invention, the movable member disposed between the optical fibers is vertically moved by providing the resilient member and the member which is deformed to be contracted when supplied with power, an optical swtich of long life is provided, in which no vertical movement of the optical fiber is required, and thus no failure, no damage, no deterioration or the like of the optical fiber occurs at all.

(2) Since according to the invention, the optical fiber is not moved vertically, it is ensured that the positioning or aligning of the optical fibers and the intercepting plate can be made positively. Once these position or alignment settings are made, the center position of the light beam is not changed during operation of the movable member, and thus its performance is always stable as well as no loss of light occurs during the transmitting of the light.

(3) Since according to the invention, the length of optical fibers in the casing is shortened extremely, for example, less than half of the conventional one due to the fact that the leading end of the optical fiber is fixed, that is, not moved vertically, the optical switch can be made to be very small.

(4) Since according to the invention, the invention does not use the conventional electromagnet of a large volume and a great weight, but the switching is made by the shape memory alloy and bimetal through the power-supplied heating, the optical switch can be made less in weight than half of that of the conventional one.

(5) Since according to the invention, the switching of the light beam is made by supplying electric power, operation can be made spontaneously, if necessary, and remotely.

(6) Since according to the invention, the construction is simpler than the conventional one, its performance is not varied, and therefore is made uniform.

(7) Since the distance between the optical fibers can be made small, insertion loss of light can be reduced.

(8) Since the inner construction is simple, the optical switch can be manufactured in small size and at low cost.

What I claim is:

1. A small swtich comprising
   a casing,
   optical fibers having ends in said casing,
   vertically movable means positioned at and spaced from said ends of said optical fibers for transmitting or blocking a light beam,
   positioning means for moving said vertically movable means,
   said positioning means having first and second ends connected to a power source so that electricity may be transmitted through said positioning means thereby changing the position of said positioning means and vertically moving said vertically movable means, and
   resilient means for positioning said vertically movable means in an initial position.

2. A small switch according to claim 1 in which said positioning means for causing said vertically movable means to move vertically comprises a shape memory alloy which is deformed by being contracted upon the supplying of power.

3. A small switch according to claim 1 in which said positioning means for causing said vertically movable means to move vertically comprises a bimetal which is actuated by a power-supplied heating.

4. A small switch according to claim 1 in which said vertically movable means comprises an intercepting plate.

5. A small switch according to claim 2 in which said vertically movable means comprises an intercepting plate.

6. A small switch according to claim 3 in which said vertically movable means comprises an intercepting plate.

7. A small switch according to claim 1 in which said vertically movable means comprises a prism, said prism being disposed, facing the ends of optical fibers.

8. A small switch according to claim 2 in which said vertically movable means comprises a prism, said prism being disposed, facing the ends of optical fibers.

9. A small switch according to claim 3 in which said vertically movable means comprises a prism, said prism being disposed, facing the ends of optical fibers.

* * * * *